United States Patent [19]

Nikulainen et al.

[11] Patent Number: 5,096,734
[45] Date of Patent: Mar. 17, 1992

[54] METHOD AND DEVICE FOR BALANCING A ROLL

[75] Inventors: Osmo Nikulainen; Jukka Koistinen, both of Jyväskylä, Finland

[73] Assignee: Valmet Paper Machinery Inc., Finland

[21] Appl. No.: 682,665

[22] Filed: Apr. 9, 1991

Related U.S. Application Data

[63] Continuation of Ser. No. 370,596, Jun. 23, 1989, abandoned.

[30] Foreign Application Priority Data

Jun. 28, 1988 [FI] Finland .................................. 883084

[51] Int. Cl.⁵ .............................................. B05D 7/22

[52] U.S. Cl. ...................................... 427/8; 427/231; 427/274; 427/256; 427/287

[58] Field of Search ................ 427/8, 231, 234, 287, 427/256

[56] References Cited

U.S. PATENT DOCUMENTS 3,506,478 4/1970 Hudson et al. .................. 427/8
4,418,093 11/1983 Gomberg et al. ................ 427/8

*Primary Examiner*—Janyce Bell
*Attorney, Agent, or Firm*—Steinberg & Raskin

[57] ABSTRACT

The present invention concerns a method and a device for the balancing of a roll. Fluidizable balancing agent is placed onto a face of the roll at a location required by the balancing, at which location the agent adheres and hardens.

10 Claims, 1 Drawing Sheet

METHOD AND DEVICE FOR BALANCING A ROLL

This is a continuation of application Ser. No. 07/370,596, filed Jun. 23, 1989 now abandoned.

BACKGROUND OF THE INVENTION

The invention concerns a method for the balancing of a roll and equipment used in this method.

The balancing of cylinders and rolls in a paper machine has been, as a rule, quite questionable. Both in dynamic balancing and in static balancing, it must be possible to place the balance weights at locations as invisible as possible, and so that the weights do not hamper operation of the device. In static balancing, it is sufficient to place the weights at the correct distance from the axis of rotation.

To accomplish dynamic balancing, it must also be possible to place balanced weights at the correct location in the roll in relation to its length. In such a case, a difficulty encountered is placing the balanced weights so that they do not hamper the operation of the roll. In such a case, usually the only alternative is to be able to place the weights inside the axle.

In prior art balancing solutions, the arrangements often required a central support axle or some other support construction, to which the balance weights can be separately attached. A particular drawback in the prior art solutions is that it has not been possible to fix the balance weights to the roll mantle face itself, because affixing to this face was not possible without damaging the inner face of the roll mantle.

Balancing solutions are also known in which liquid has been passed into separate filling compartments in the interior of the roll. A drawback of this solution is the high cost of construction. It has been necessary to construct separate liquid compartments in the interior of the roll to permit balancing.

SUMMARY OF THE INVENTION

Accordingly, it is an object of the present invention to overcome the balancing problems described above and to provide a balancing method and balancing equipment of an entirely new type, especially for rolls and cylinders in paper machines.

These and other objects are attained by the present invention which is directed to a method for balancing a roll, comprising the step of placing onto a face of the roll, a fluidizable balancing agent at a location required for balancing, whereby the agent adheres to the roll face and hardens at this location. The present invention is also directed to apparatus for balancing a roll, which comprises means for delivering fluidizable balancing agent to a location required for balancing the roll on a surface thereof, where the agent adheres and hardens.

In the present invention, the use of a fluidizable mix for balancing has been achieved, this mix hardening to its ultimate hardness after it has been applied to the balancing point or location.

The method in accordance with the present invention is principally characterized by a fluidizable balancing agent being placed onto a face of the roll at a location required by the balancing, at which location the agent adheres and hardens.

The equipment in accordance with the present invention is principally characterized by its comprising means by which the fluidizable balancing agent can be brought to the balancing point, at which the agent adhere and hardens.

The balancing mix that is used is preferably polyurethane or silicon mix or epoxy resin. It is also possible to use some other substance which can strongly adhere to a cleaned cylinder mantle face even with high material thicknesses. The balancing agent is chosen The bearing in mind that the hardening time must be sufficiently short. Before the balancing mix is placed at the balancing location inside the roll onto its inner mantle face, the face is cleaned.

By means of the method of the invention, a balance weight can be placed on the roll mantle at any location whatsoever, between the ends of the roll. In the method of the invention, mechanical components are not required. A suitable amount of the balancing agent is applied to the desired location, and the agent is allowed to dry to the ultimate hardness. The balance weight does not require any separate protecting covers either.

BRIEF DESCRIPTION OF THE DRAWINGS

The present invention will be further described below with reference to certain advantageous embodiments thereof illustrated in the accompanying drawings and to which, however, the present invention is not intended to be confined. In the drawings.

DESCRIPTION OF THE PREFERRED EMBODIMENTS

Figure 1:
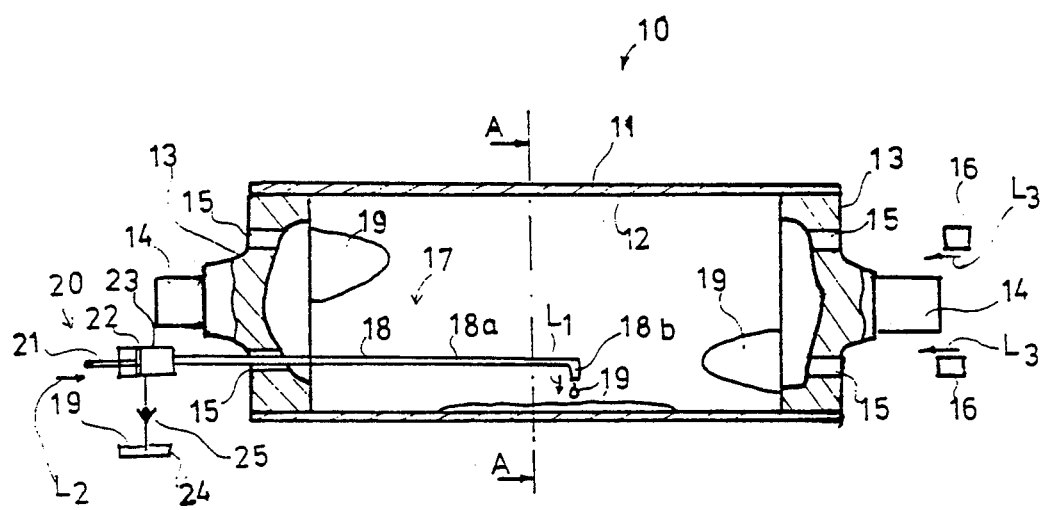
FIG. 1 is a longitudinal sectional view of a paper machine roll.

FIG. 1 provides a more detailed illustration of the method in accordance with the present invention, and of the equipment for carrying out this method. The roll 10 comprises a roll mantle 11 whose ends are provided with end flanges 13. The axle journals 14 are connected to the end flanges 13. The flange 13 includes a hole 15 passing through the flange, preferably a cast hole or a bore made afterwards.

A device 17 for application of the balance weight comprises a duct 18, preferably a rigid pipe, through which the balancing agent 19 is passed to the balancing point. The pipe comprises a straight portion 18a and an end portion 18b which is situated at the end of the straight portion 18a and is substantially at an angle of 90° to the straight portion 18a. The pipe 18 is introduced into the roll 10 through the hole 15. The balancing agent is composed of a resilient, elastic, fluidizable mix which solidifies to its ultimate hardness only after it has been placed onto the balancing point, e.g. onto an inner face 12 of the roll 10 (in the direction of arrow $L_1$).

Before balancing, the inner face 12 of the roll 10 must be carefully cleaned. At the end of the pipe 18, an actuator 20 is fitted by which the balancing agent 19 is conveyed to the balancing point. The device 20 is preferably composed of a cylinder which has a piston 22 therein. The balancing agent is suctioned out of a tank 24 or equivalent and into the space between the cylinder mantle 23 and the piston 22. When the piston 22 is displaced by means of a shaft 21 in the direction $L_2$, the flow of the balancing agent 19 back into a tank 24 is prevented by means of a one-way valve 25.

Figure 2:
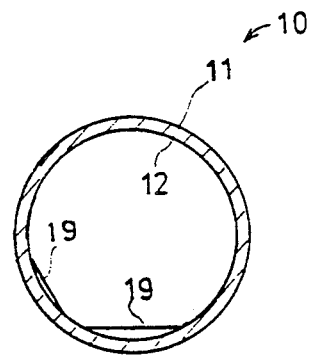
FIG. 2 is a sectional view taken along line A—A in FIG. 2.

FIG. 2 is a sectional view taken along line A—A in FIG. 1. When the balancing is being carried out, the roll 10 is rotated so that the balancing point becomes positioned at the bottom location in relation to the rest of the roll mantle. In this way, the desired quantity of balancing agent 19 is brought to the desired point. It is permitted to harden before the roll 10 is rotated to the next balancing position, i.e. the roll 10 is rotated only after the agent 19 has hardened, with additional balancing agent then being conveyed to the new balancing location at the lowest position of the roll.

The device 17 comprises a substantially rigid pipe 18 which is turn comprises a substantially straight portion 18a extending from the actuator 20, and at an end thereof, a downwardly-directed portion 18b. By means of this pipe form, the balancing agent 19 can be exactly transferred to the desired location on the inner face 12 of the roll mantle 11.

A fluid mix is used as the balancing agent 19 which hardens by means of heat, air, moisture, or other additional components, or which can be separately hardened to its ultimate hardness only after it has been applied to the balancing location. Advantageously, the balancing agent 19 is that used in polyurethane or epoxy resin or silicon mix.

After the balancing has been carried out, the holes 15 are preferably closed by means of plugs 16. Arrows $L_3$ denote the application of the plugs 16 into the respective holes 15 after the balancing.

The preceding description of the present invention is merely exemplary, and is not intended to limit the scope thereof in any way.

What is claimed is:

1. Method for balancing an unbalanced roll, comprising the steps of
    determining one or more locations on an inner surface of a roll mantle of an unbalanced roll to which the application of a balancing weight will result in the weight of said roll being substantially equally distributed both about its axis of rotation and across its length,
    placing onto said inner surface of said mantle of the unbalanced roll, a fluidizable balancing agent only at said one or more locations on said inner surface required for balancing the unbalanced roll,
    and allowing the agent to adhere and harden at said one or more locations while said roll is both stationary and nonrotating.

2. The method of claim 1, comprising the additional step of
    placing the balancing agent onto an inner face of a mantle of the roll.

3. The method of claim 2, comprising the additional step of
    introducing the balancing agent at the balancing location through a pipe.

4. The method of claim 3, comprising the additional step of
    passing the balancing agent into the pipe by means of an actuator.

5. The method of claim 4, wherein the actuator is a cylinder with a piston mounted therein.

6. The method of claim 3, comprising the additional step of
    introducing the pipe into an interior space of the roll mantle through a hole provided in a flange situated at an end of the roll mantle.

7. The method of claim 1, comprising the additional step of
    rotating the roll so that the balancing location is rotated to a first position,
    whereby the balancing agent remains exactly at said balancing location before hardening,
    then rotating the roll again only after the balancing agent has hardened so as to bring another balancing location to the lowest position, and
    then again conveying the balancing agent to said another balancing location now at first position.

8. The method of claim 6, comprising the additional step of
    plugging the hole after the balancing is completed.

9. The method of claim 1, wherein the balancing agent is polyurethane or silicon mix or epoxy resin.

10. The method of claim 1, comprising the additional step of
    cleaning the roll face before the balancing agent is applied thereto.

* * * * *